United States Patent
Monrose et al.

(10) Patent No.: US 9,934,379 B2
(45) Date of Patent: Apr. 3, 2018

(54) METHODS, SYSTEMS, AND COMPUTER READABLE MEDIA FOR DETECTING A COMPROMISED COMPUTING HOST

(71) Applicant: The University of North Carolina at Chapel Hill, Chapel Hill, NC (US)

(72) Inventors: Fabian Monrose, Chapel Hill, NC (US); Teryl Taylor, Carrboro, NC (US); Srinivas Krishnan, Berkeley, CA (US); John McHugh, Saluda, NC (US)

(73) Assignee: The University of North Carolina at Chapel Hill, Chapel Hill, NC (US)

( * ) Notice: Subject to any disclaimer, the term of this patent is extended or adjusted under 35 U.S.C. 154(b) by 10 days.

(21) Appl. No.: 14/773,660

(22) PCT Filed: Mar. 5, 2014

(86) PCT No.: PCT/US2014/020683
§ 371 (c)(1),
(2) Date: Sep. 8, 2015

(87) PCT Pub. No.: WO2014/138205
PCT Pub. Date: Sep. 12, 2014

(65) Prior Publication Data
US 2016/0026796 A1    Jan. 28, 2016

Related U.S. Application Data (60) Provisional application No. 61/772,905, filed on Mar. 5, 2013.

(51) Int. Cl.
G06F 21/56 (2013.01)
G06F 21/57 (2013.01)
H04L 29/06 (2006.01)

(52) U.S. Cl.
CPC ............ G06F 21/562 (2013.01); G06F 21/57 (2013.01); H04L 63/1441 (2013.01); G06F 2221/034 (2013.01); H04L 2463/144 (2013.01)

(58) Field of Classification Search
CPC .... G06F 21/57; G06F 2221/034; G06F 21/56; H04L 63/1441; H04L 2463/144
(Continued)

(56) References Cited

U.S. PATENT DOCUMENTS 6,892,163 B1 * 5/2005 Herzog .............. G05B 23/0254
                                                              700/30
8,260,914 B1    9/2012 Ranjan
(Continued)

OTHER PUBLICATIONS

Bordel, "Detecting Malicious Components in Large-Scale Internet-of-Things Systems and Architectures", 2017, pp. 155-165.*
(Continued)

Primary Examiner — Thanhnga B Truong
Assistant Examiner — Gregory Lane
(74) Attorney, Agent, or Firm — Jenkins, Wilson, Taylor & Hunt, P.A.

(57) ABSTRACT

Methods, systems, and computer readable media for detecting a compromised computing host are disclosed. According to one method, the method includes receiving one or more domain name system (DNS) non-existent domain (NX) messages associated with a computing host. The method also includes determining, using a host score associated with one or more unique DNS zones or domain names included in the one or more DNS NX messages, whether the computing host is compromised. The method further includes performing, in response to determining that the computing host is compromised, a mitigation action.

22 Claims, 8 Drawing Sheets

(58) Field of Classification Search
USPC .................................................. 726/23, 24
See application file for complete search history.

(56) References Cited

U.S. PATENT DOCUMENTS

| | | | | |
|---|---|---|---|---|
| 8,555,388 | B1* | 10/2013 | Wang | H04L 63/1416 709/245 |
| 2009/0083413 | A1 | 3/2009 | Levow et al. | |
| 2010/0037314 | A1* | 2/2010 | Perdisci | H04L 63/1416 726/22 |
| 2011/0154359 | A1* | 6/2011 | Toub | G06F 9/5033 718/106 |
| 2011/0185422 | A1* | 7/2011 | Khayam | H04L 63/1425 726/23 |
| 2011/0197278 | A1* | 8/2011 | Chow | H04L 63/1458 726/24 |
| 2012/0047173 | A1 | 2/2012 | Thomas | |
| 2012/0131285 | A1* | 5/2012 | Leshchiner | G06F 9/544 711/147 |
| 2012/0174220 | A1 | 7/2012 | Rodriguez | |
| 2013/0014253 | A1 | 1/2013 | Neou et al. | |
| 2013/0166571 | A1* | 6/2013 | Thomas | G06F 3/0233 707/748 |
| 2014/0089539 | A1* | 3/2014 | Hudzia | G06F 9/52 710/52 |

OTHER PUBLICATIONS

Notification of Transmittal of the International Search Report and the Written Opinion of the International Searching Authority, or the Declaration for International Application No. PCT/US2014/020683 (dated Jul. 3, 2014).
Amazon Web Services, "CloudFront Concepts," Amazon CloudFront Developer Guide (2012).
Antonakakis et al., "Building a Dynamic Reputation System for DNS," Proceedings of 19th USENIX Security Symposium (2010).
Antonakakis et al., "Detecting Malware Domains at the Upper DNS Hierarchy," Proceedings of 20th USENIX Security Symposium (2011).
Antonakakis et al., "From Throw-Away Traffic to Bots: Detecting the Rise of DGA-based Malware," Proceedings of 21st USENIX Security Symposium (2012).
Bilge et al., "EXPOSURE: Finding Malicious Domains using Passive DNS Analysis," Proceedings of the Annual Network and Distributed System Security (NDSS) (Feb. 2011).
Born et al., "Detecting DNS Tunnels Using Character Frequency Analysis," Proceedings of the 9th Annual Security Conference (ACSAC) (2010).
Chrome Team, "The Chromium Projects," (undated).
Crawford et al., "Kwyjibo: Automatic domain name generation," Software: Practice and Experience, vol. 38, Issue 14 (Nov. 2008).
Dilley et al., "Globally distributed content delivery," Internet Computing, IEEE, vol. 6, Issue 5 (Sep./Oct. 2002).
Duda et al. "Pattern Classification," Springer-Verlag New York, Inc., Secaucus, NJ, USA (Sep. 2007).
Eckelberry, Massive Italian typosquatting ring foists malware on users (2007).
Everitt et al., "Cluster Analysis," Wiley Series in Probability and Statistics, Wiley (2011).
Felegyhazi et al., "On the Potential of Proactive Domain Blacklisting," Proceedings of the 3rd USENIX conference on Large-Scale Exploits and Emergent Threats (LEET), International Computer Science Institute, Berkley, California, USA (2010).
Golovanov et al., "TDL4 Top Bot," (2011).
Hao et al., "Monitoring the Initial DNS Behavior of Malicious Domains," Proceedings of the 2011 ACM SIGCOMM Internet Measurement Conference, pp. 269-278 (2011).
Ho et al., "Fast Detection of Mobile Replica Node Attacks in Wireless Sensor Networks Using Sequential Hypothesis Testing," IEEE Transactions on Mobile Computing, vol. 10, Issue 6, pp. 767-782 (Jun. 2011).
Fraser Howard, "Exploring the Blackhole Exploit Kit," SophosLabs, UK (2012).
ISC, "Google Chrome and (weird) DNS Requests," (2011).
Jung et al., "Fast Portscan Detection Using Sequential Hypothesis Testing," IEEE Symposium on Security and Privacy (May 2004).
Jung et al., "On the Adaptive Real-Time Detection of Fast-Propagating Network Worms," Journal in Computer Virology, vol. 4, Issue 3, pp. 197-210 (Aug. 2008).
Dan Kaminsky, "Black ops 2008—it's the end of the cache as we know it," Black Hat USA (2008).
Kullback et al., "On Information and Sufficiency," The Annals of Mathematical Statistics, vol. 22, Issue 1, pp. 79-86, Institute of Mathematical Statistics, USA (Mar. 1951).
Schechter et al., "Fast Detection of Scanning Worm Infections," Proceedings of the International Symposium on Recent Advances in Intrusion Detection (RAID), pp. 59-81, France (2004).
Sommer et al., "An Architecture for Exploiting Multi-Core Processors to Parallelize Network Intrusion Prevention," Concurrency and Computation: Practice & Experience—Multi-core Supported Network and System Security, vol. 21, Issue 10, pp. 1255-1279 (Jul. 2009).
Son et al., "The Hitchhiker's Guide to DNS Cache Poisoning," Proceedings of 6th International ICST Conference Security and Privacy in Communication Networks (SecureComm), Singapore, pp. 466-483. Springer (Sep. 2010).
Stone-Gross et al., "Your Botnet is my Botnet: Analysis of a Botnet Takeover," Proceedings of the ACM Conference on Computer and Communications Security (CCS), pp. 635-647 (2009).
Unmask Parasites, "Runforestrun and Pseudo Random Domains," (2012).
John Valois, "Implementing Lock-Free Queues," Proceedings of the 7th International Conference on Parallel and Distributed Computing Systems, pp. 64-69 (1994).
Villamarin-Salomon et al., "Identifying Botnets Using Anomaly Detection Techniques Applied to DNS Traffic," IEEE Consumer Communications & Networking Conference (CCNC) (2008).
Wald, "Sequential Analysis," John Wiley and Sons, Inc., 1947.
Weaver et al., "Very Fast Containment of Scanning Worms, Revisited," Malware Detection, pp. 113-145, Springer, USA (2007).
West, "Chrome connects to three random domain at startup," http://goo.gl/68u9P, 2012.
Yadav et al., "Detecting Algorithmically Generated Malicious Domain Names," Proceedings of the Internet Measurement Conference (IMC), pp. 48-61 (2010).
Yadav et al., "Winning with DNS Failures: Strategies for Faster Botnet Detection," International Conference on Security and Privacy in Communication Networks (2011).
"Crossing the Threshold: Detecting Network Malfeasance via Sequential Hypothesis Testing" (2013).

* cited by examiner

METHODS, SYSTEMS, AND COMPUTER READABLE MEDIA FOR DETECTING A COMPROMISED COMPUTING HOST

PRIORITY CLAIM

This application claims the benefit of U.S. Provisional Patent Application Ser. No. 61/772,905, filed Mar. 5, 2013, the disclosure of which is incorporated herein by reference in its entirety.

GOVERNMENT INTEREST

This invention was made with government support under Grant No. OCI-1127361 awarded by the National Science Foundation. The government has certain rights in the invention.

TECHNICAL FIELD

The subject matter described herein relates to communications networks. More specifically, the subject matter relates to methods, systems, and computer readable media for detecting a compromised computing host.

BACKGROUND

Compromised hosts are a cause for concern for many end users and network operators. For example, after being infected by botnet programs or other malicious software, a compromised host may be controlled remotely and/or instructed to perform malicious activities. Exemplary malicious activities may include flooding a network or node with numerous packets, intercepting or redirecting traffic, wasting network resources, or other unwanted activities.

Some compromised hosts may attempt to communicate with a command server for receiving instructions for performing malicious activities. Network operators try to identify compromised hosts and their command servers to thwart malicious effects associated with the compromised hosts. However, since current malicious software has made significant strides in camouflaging or obfuscating compromised hosts and/or command servers, many network operators are incapable of quickly and efficiently detecting compromised hosts and/or mitigating their malicious activities.

Accordingly, there exists a need for improved methods, systems, and computer readable media for detecting a compromised computing host.

SUMMARY

Methods, systems, and computer readable media for detecting a compromised computing host are disclosed. According to one method, the method includes receiving one or more domain name system (DNS) non-existent domain (NX) messages associated with a computing host. The method also includes determining, using a host score associated with one or more unique DNS zones or domain names included in the one or more DNS NX messages, whether the computing host is compromised. The method further includes performing, in response to determining that the computing host is compromised, a mitigation action.

A system for detecting a compromised computing host is also disclosed. The system includes a processor. The system also includes a compromised host detection (CHD) module executable by the processor. The CHD module is configured to receive one or more domain name system (DNS) non-existent domain (NX) messages associated with a computing host, to determine, using a host score associated with one or more unique DNS zones or domain names included in the one or more DNS NX messages, whether the computing host is compromised; and to perform, in response to determining that the computing host is compromised, a mitigation action.

The subject matter described herein can be implemented in software in combination with hardware and/or firmware. For example, the subject matter described herein can be implemented in software executed by a processor. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the terms "node" and "host" refer to a physical computing platform including one or more processors and memory.

As used herein, the terms "function" and "module" refer to software in combination with hardware and/or firmware for implementing features described herein.

As used herein, the terms "DNS zone" or "domain" refer to a portion of a domain name space using the Domain Name System (DNS). For example, a DNS zone may be a portion of a domain name space where administrative responsibility has been delegated to an authorized entity (e.g., a Google DNS server may handle a "google.com" DNS zone).

As used herein, the term "compromised computing host" refers to any device or computing platform that can be controlled remotely and/or instructed to perform malicious activities.

BRIEF DESCRIPTION OF THE DRAWINGS

Preferred embodiments of the subject matter described herein will now be explained with reference to the accompanying drawings, wherein like reference numerals represent like parts, of which:

FIG. 6 is a diagram illustrating an exemplary approach for visualizing domain name traffic according to an embodiment of the subject matter described herein.

DETAILED DESCRIPTION

The subject matter described herein includes methods, systems, and computer readable media for detecting a compromised computing host. Reference will now be made in detail to exemplary embodiments of the subject matter described herein, examples of which are illustrated in the accompanying drawings. Wherever possible, the same reference numbers will be used throughout the drawings to refer to the same or like parts.

Figure 1A:
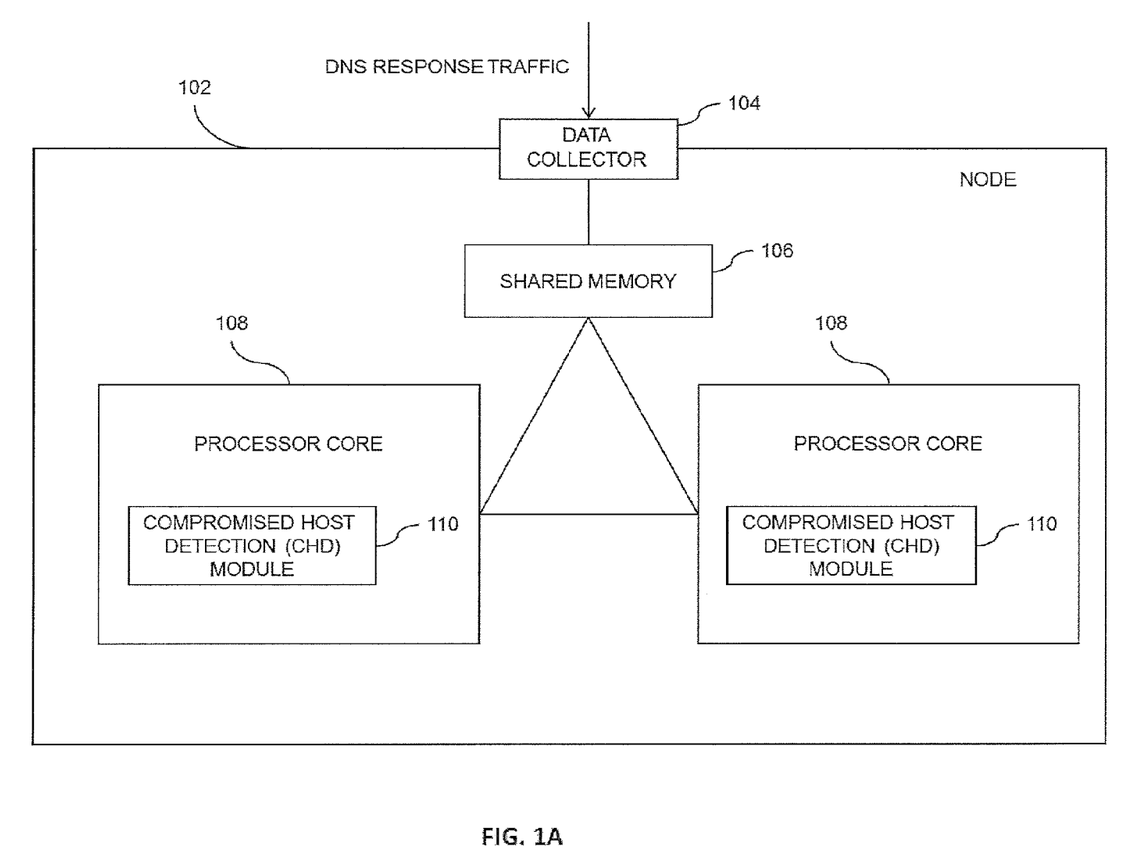
FIG. 1A is a diagram illustrating an exemplary node for detecting a compromised computing host according to an embodiment of the subject matter described herein.

FIG. 1A is a diagram illustrating an exemplary node 102 (e.g., a single or multiple processing core computing device) for detecting a compromised computing host (e.g., a computer, a tablet device, a smartphone, or other device) according to an embodiment of the subject matter described herein. Node 102 may be any suitable entity, such as a computing device or platform, for performing one more aspects associated with detecting a compromised computing host. For example, node 102 may be a computer with network communications capability. In some embodiments, components, modules, and/or portions of node 102 may be implemented or distributed across multiple devices or computing platforms.

Node 102 may include a data collector 104, a shared memory 106, and one or more processor cores 108. Data collector 104 may be any suitable entity (e.g., a communications interface and/or a data acquisition and generation card (DAG)) for receiving, intercepting, observing, and/or copying messages. In some embodiments, data collector 104 may include and/or associate with a tap. For example, a tap associated with data collector 104 may be operatively associated with a link or node. The tap may observe and copy packets that traverse the link or node. Data collector 104 may be configured to receive domain name server (DNS) response traffic and store the DNS response traffic, or a portion thereof, to shared memory 106.

In some embodiments, data collector 104 may monitor traffic associated with hosts associated with a given location or network, e.g., a university campus or a local network. For example, monitored traffic may include client-side DNS traffic, including the benign queries (e.g., from web browsing sessions) as well as malicious queries. However, since benign activities mostly result in successful DNS responses, data collector 104 or another entity may filter successful DNS responses and other benign traffic and focus on DNS NX messages.

In some embodiments, data collector 104 may receive or filter traffic such that only certain types of DNS response messages are stored in shared memory 106. For example, data collector 104 may filter DNS response traffic and store only DNS non-existent domain (NX) messages. DNS NX messages may include any messages that indicate that a domain name is not valid, does not exist, or is not registered at a DNS server. In another example, DNS response traffic may be filtered prior to being received by data collector 104. In some embodiments, data collector 104 may alter or modify traffic, e.g., to make DNS response traffic anonymous or discard or encrypt sensitive payload data.

In some embodiments, data collector 104 or another component may be configured to identify or select a processor core 108 for analyzing one or more DNS NX messages. For example, data collector 104 may mark certain DNS NX messages for processing by a certain processor core 108. In another example, data collector 104 may notify each processor core 108 about which DNS NX messages the processor core 108 is to process.

Shared memory 106 may be any suitable entity (e.g., random access memory or flash memory) for storing DNS response traffic and/or other information, such as a parameters or counters usable to detect compromised hosts. Various components, such as data collector 104 and software executing on processor cores 108, may access shared memory 106. In some embodiments, shared memory 106 may be associated with a lock-free data structure. For example, multiple cores may use a lock-free data structure to analyze various portions of a DNS response message stored in shared memory 106. In this example, atomic operations (e.g., a compare and swap instruction) may be used when accessing or processing data in shared memory 106.

Processor core 108 represents any suitable entity (e.g., a general purpose microprocessor, a field-programmable gateway array (FPGA), and/or an application-specific integrated circuit (ASIC)) for performing one or more functions associated with detecting a compromised computing host. Processor core 108 may be associated with a compromised host detection (CHD) module 110. CHD module 110 may be configured to use various techniques (e.g., sequential hypothesis testing of one or more DNS NX messages) in determining whether a computing host is compromised (e.g., infected with malicious software).

In some embodiments, CHD module 110 may be configured to work in parallel with a plurality of processor cores 108. For example, processor cores 108 may each be associated with a CHD module 110 and/or a lock-free data structure. In this example, each CHD module 110 may process messages independently or may work in concert with other CHD modules 110 where each CHD module 110 processes a portion of a message.

In some embodiments, CHD module 110 may select one or more DNS NX messages to process or may retrieve messages from a queue and/or as instructed, e.g., by a central distribution entity. For example, each CHD module 110 may handle DNS NX messages associated with a certain portion of shared memory 106.

CHD module 110 may be configured to perform a sequential probability ratio test and/or other sequential hypothesis tests. Sequential hypothesis testing or sequential analysis may include any method of making decisions using data. Some statistical hypothesis tests may define a procedure which fixes or controls the probability of incorrectly deciding that a null hypothesis is incorrect based on how likely it would be for a set of observations to occur if the null hypothesis were true. For example, sequential testing generally works by examining samples (e.g., packets or DNS zones or domain names in received DNS NX message) one-by-one, and evaluating a decision function (e.g., compromised host, uncompromised host, or continue testing) at each sample. Generally, sequential testing stops after enough "evidence" is collected for a decision. Depending on configuration parameters, sequential testing may determine compromised computing hosts very quickly and, as such, may minimize malicious communications and/or related activities.

In some embodiments, sequential analysis or sequential hypothesis testing may detect compromised computing hosts in a very short period of time, e.g., a few seconds. For example, sequential hypothesis testing may detect a compromised host prior to or contemporaneously with the compromised host communicating with a malicious entity. In another example, sequential testing may detect a compromised host before the compromised host performs a malicious activity, such as flooding a network with packets.

In some embodiments, a sequential hypothesis test may use one or more parameters (e.g., based on the probability distribution of the data) when testing some sequence of samples (e.g., DNS zones or domain names) for a hypothesis (e.g., computing is host is compromised) to determine one or more threshold value(s), e.g., a benign threshold value and a malicious threshold value. For example, if a host score associated with the computing host reaches or exceeds one of the threshold values, it may be indicative of a computing host condition or classification. Parameters used in determining a threshold value may be based on various factors, such as a network characteristic, a network delay, a user base, a resource utilization indicator, a resource characteristic, or a predetermined value. If after testing a first sample, the threshold value is exceeded, a decision can be made and the test can end. However, if the threshold is not exceeded, testing may continue until the threshold is reached or a certain number of samples have been examined.

In some embodiments, a lock-free data structure may be utilized in performing one or more aspects of processing or statistical analysis associated with determining whether a computing host is compromised. For example, a lock-free data structure may be used for processing in parallel a plurality of streams (e.g., each stream may include packets or messages associated with one computing host). In this example, the lock-free data structure may allow each processor or core 108 to process DNS NX messages independently of other cores 108.

In some embodiments, node 102, data collector 104, and/or CHD module 110 may be configured to perform parallel processing, such that multiple packets (e.g., from different computing hosts, sessions, and/or links) may be analyzed concurrently. For example, CHD module 110 may be configured to perform statistical hypothesis-based analysis by accessing and/or processing samples via a lock-free data structure. The analysis may be used to determine whether a computing host is compromised using a host score associated with unique DNS zones or domain names. For example, a payload portion of one or more DNS NX messages may be analyzed to identify a DNS zone or domain name associated with each DNS NX message. The host score may be incremented when a received DNS NX message is associated with a unique DNS zone or domain name. The host score may be decremented when a received DNS NX message is associated with a non-unique DNS zone or domain name. If the host score reaches or exceeds a threshold indicating a benign host, the computing host may be classified as benign or not compromised. If the host score reaches or exceeds a threshold indicating a malicious or compromised host, the computing host may be classified as compromised.

In another example, a single threshold may be used to determine whether a computing host is compromised. In this example, if the single threshold is reached or exceeded within a certain or predetermined amount of time, the computing host may be classified or considered compromised. However, if the threshold is not reached or exceeded within the amount of time allotted, the computing host may be classified or considered benign (e.g., not compromised).

In some embodiments, a unique DNS zone or domain name may be indicative of a malicious activity or a compromised host. For example, a unique DNS zone or domain name may be previously unknown to the computing host or a validating entity and may indicate that an associated host is algorithmically generating domain names or exhibiting behavior similar to known behavior of compromised hosts.

In some embodiments, a non-unique DNS zone or domain name may be indicative of a benign activity or a benign host. For example, a non-unique DNS zone or domain names may be previously known to the computing host or a validating entity and may indicate that an associated host is exhibiting normal or benign behavior.

If a threshold value (e.g., a malicious threshold value) is reached or exceeded (e.g., indicating that a certain number of unique DNS zones or domain names were in received DNS NX messages associated with a certain host within a certain time period), appropriate actions (e.g., mitigation actions) may be performed, e.g., preventing compromised hosts from interacting with unknown or malicious domain names or servers, logging data about the compromised host, or informing a network operator.

Figure 1B:
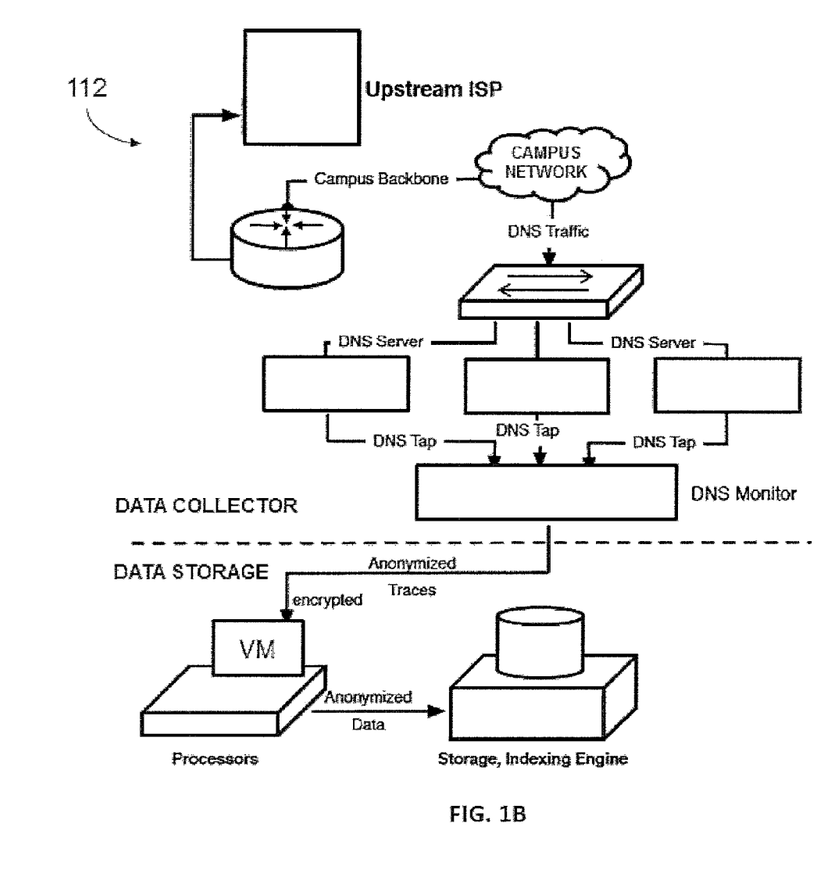
FIG. 1B is a diagram illustrating an exemplary environment for collecting DNS NX messages according to an embodiment of the subject matter described herein.

FIG. 1B is a diagram illustrating an exemplary environment 112 for collecting DNS NX messages according to an embodiment of the subject matter described herein. In some embodiments, exemplary environment 112 may include various components or resources associated with monitoring, receiving, and/or processing DNS related traffic.

In FIG. 1B, environment 112 may include resources for performing data collection and data storage. Data collection may include using DNS taps (e.g., software or "line" taps) that monitors and copies DNS traffic sent or received by a DNS server, e.g., from one or more hosts in a campus network. The monitored DNS servers may act as primary name servers for an entire campus network (e.g., a wireless network as well as wired network including student residences and several academic departments around campus). For example, such DNS servers may serve tens of thousands of hosts daily. In this example, the monitored DNS servers monitored may be located behind a load balancer and all wireless clients using the campus network may be assigned to one of these name servers during their DHCP registration.

In some embodiments, DNS traffic, such as DNS NX messages, from monitored DNS servers may be collected by a DNS monitor (e.g., data collector 104). DNS monitor may anonymize and/or encrypt collected DNS traffic, e.g., such that sensitive information is discarded or protected. DNS monitor may provide the anonymized and/or encrypted data to one or more storage devices (e.g., shared memory 106) and/or processing devices (e.g., processor cores 108).

TABLE 1

|  | March 18 | March 19 | March 20 |
|---|---|---|---|
| # of DNS Clients | 49.7K | 75.4K | 77.1K |
| # of DNS Queries | 37.3M | 61.2M | 60.3M |
| # of NX response | 1.3M | 1.8M | 1.7M |
| # of distinct domains | 1.5M | 1.8M | 1.8M |
| # of distinct zones | 373.4K | 528.2K | 566.4K |
| # of distinct NX domains | 190.4K | 216.2K | 220.4K |
| # of distinct NX zones | 15.3K | 22.1K | 24.2K |

Table 1 shown above depicts some statistics from sample traffic collected from a campus environment over three days in 2012. The increase in traffic on March 19th corresponds to the start of the work week. Table 1 indicates that approximately 3% of all DNS queries result in DNS NX messages. As indicated in Table 1, AGDs (e.g., distinct NX domains) comprise a surprisingly small amount of overall NX traffic, but may be indicative of the overall health of an enterprise network, e.g., as related to number of compromised hosts using the enterprise network.

It will be appreciated that FIGS. 1A and 1B are for illustrative purposes and that various nodes, their locations, and/or their functions may be changed, altered, added, or removed. For example, some nodes and/or functions may be combined into a single entity. In a second example, a node and/or function may be located at or implemented by two or more nodes. Further, as indicated above, a computing host may be any node and, as such, a computing host may be a client and/or server.

Figure 2:
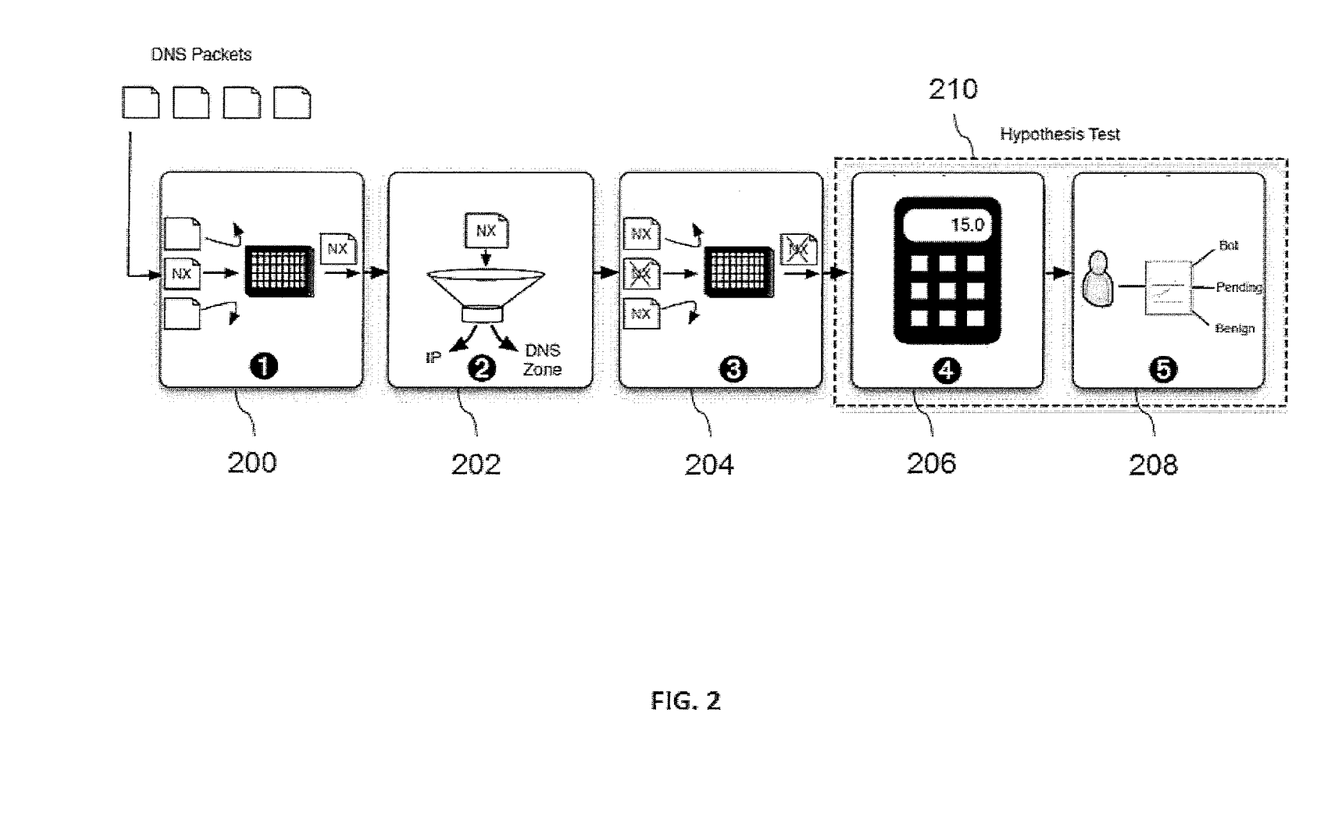
FIG. 2 is a diagram illustrating an exemplary approach for detecting a compromised computing host according to an embodiment of the subject matter described herein.

FIG. 2 is a diagram illustrating an exemplary approach for detecting a compromised computing host according to an embodiment of the subject matter described herein. In some embodiments, identifying or attaining ground truth (e.g., a list of compromised hosts or hosts exhibiting botnet-like behavior from the hosts to be tested or monitored) may be useful when testing or determining the effectiveness or accuracy of a classification technique or approach. For example, ground truth may be used to determine whether correct classifications are made during testing or live environments since any classifications that are contrary to the ground truth would be suspect (e.g., a false positive or a false negative). One technique for attaining ground truth related to classifying compromised host may include removing hosts that did not receive DNS NX messages (e.g., during a monitored period) and by discarding any DNS NX messages from white-listed DNS NX zones (e.g., senderbase.org). For example, a white-list may be created by manually inspecting the top 100 zones of domain names that elicit DNS NX responses from observed data or another source.

In some embodiments, domain names that received DNS NX messages may be checked against well-known blacklists for identifying known bots or compromised hosts. In some embodiments, various techniques may be utilized for identifying new bots or compromised hosts, e.g., previously unknown during analysis. For example, one technique involves performing lookups on domains that received DNS NX messages at a later date to see if any of those domains are now sink-holed, e.g., blocked by a DNS server. In another example, domain names may be classified on whether they had similar name structure as existing algorithmically generated domain names (AGDs), generated a sequence of at least two or more domains names that followed a similar structural convention (e.g., character set and length of the domain name), and received DNS NX responses.

In some embodiments, detecting a compromised computing host may include using sequential hypothesis testing associated with traffic patterns, e.g., rather than properties of a domain name. For example, assuming a compromised host tends to scan a DNS namespace looking for a valid command-and-control server or other malicious entity, a compromised host may generate a relatively high number of unique second-level domains that elicit more DNS NX messages than a benign host. In this example, sequential hypothesis testing [30] may be used to classify hosts as compromised based on observations of unique DNS NX messages.

Referring to FIG. 2, in step 1 200, DNS NX messages are obtained and analyzed. For example, data collector 104 or another entity may ignore various packets and obtain only DNS NX messages thereby reducing the amount of data analyzed significantly, e.g., by 90%.

In step 2 202, information, such as an IP address and a DNS zone associated with a domain name, may be obtained or extracted from each DNS NX message. For example, CHD module 110 or another entity may process one or more DNS NX messages associated with a host and may use that information in various detection techniques.

In step 3 204, benign DNS NX messages and related benign traffic may be filtered or discarded. For example, CHD module 110 or another entity may filter DNS NX messages for benign (e.g., well-known, approved, and/or whitelisted) domain names. In this example, by filtering or discarding benign traffic, including benign DNS NX messages, a vast majority of DNS packets are discarded or ignored, thereby allowing classifications to occur at higher network speeds.

In some embodiments, additional traffic filtering may be performed. For example, CHD module 110 or another entity may filter DNS NX messages associated with fully qualified domain names (FQDNs) (e.g., "www.example.com"), while leaving DNS NX messages associated with second level DNS zones (e.g., "example.com") remaining to be processed and/or analyzed. Since many compromised hosts (e.g., bots) generate randomized second-level domains in order make it more difficult to blacklist them and/or to hamper take-down efforts, such filtering may improve classification speed with little to no effect on accuracy.

In some embodiments, traffic filtering may also utilize known or expected traffic patterns or related distributions. For example, DNS NX traffic access patterns for benign hosts may follow a Zipf's law distribution, e.g., a second most common zone will occur ½ as often as a first most common zone, a third most common zone will occur ⅓ as often as the first most common zone and a nth most common zone will occur 1/n as often as the first most common zone. In this example, over 90% of collected DNS NX messages may be associated with 100 unique zones. Assuming DNS traffic associated with malicious or compromised hosts lie in the tail of a Zipf curve (e.g., hidden by the vast amounts of benign traffic), CHD module 110 or another entity may filter benign data by applying a Zipf filter. An exemplary Zipf filter may include a top 100 most popular zones and may involve removing matches using a perfect hash.

In step 4 206, a host score may be determined and/or adjusted using zone information associated with the remaining (e.g., unclassified) DNS NX messages. For example, a host score may be adjusted up or down based on whether a host has seen a given zone before, e.g., +1 if a zone has been previously unseen or −1 if the zone has already been seen.

In step 5 208, the host score may be compared to a benign threshold value (e.g., a value indicative of a benign host) and a malicious threshold value (e.g., a value indicative of a compromised host). If either threshold is crossed, then the host is classified. Otherwise, the host may remain in a pending state, e.g., waiting for additional DNS NX messages.

In some embodiments, step 4 206 and step 5 208 may be included in or associated with a hypothesis test 210. Hypothesis test 210 may attempt to accurately classify a host as compromised or benign while observing as few outcomes (e.g., DNS NX messages) as possible. Hypothesis test 210 may use two competing hypotheses, which are defined as follows:

Null hypothesis $H_0$=the local host I is benign.
Alternative hypothesis $H_i$=the local host I is compromised (e.g., the local host I is a bot controllable by a malicious entity).

Hypothesis test 210 may observe success and failure outcomes ($Y_i$, i=1 . . . n) in sequence and updates a host score for the local host I (e.g., a host score) after each outcome. A success may increment the host score (towards a benign threshold while a failure may decrement the host score (e.g., towards a malicious threshold). In some embodiments, a success and failure outcome may be defined as follows:

Success $Y_i=1$; the local host I receives an DNS NX message for non-unique DNS zone, e.g., a DNS zone it has already seen.

Failure $Y_i=0$; the local host I receives an DNS NX message for a unique DNS zone, e.g., a DNS zone it has not already seen.

In some embodiments, an amount to adjust (e.g., decremented or incremented) a host score may be determined by the values $\theta_0$ and $\theta_1$. The value of $\theta_0$ may be defined as the probability $(P_r)$ that a benign host generates a successful event, while $\theta_1$ may be the probability that a malicious host generates a successful event. More formally, $\theta_0$ and $\theta_1$ are defined as:

$$P_r[Y_i=0|H_0]=\theta_0, P_r[Y_i=1|H_0]=1-\theta_0$$

$$P_r[Y_i=0|H_1]=\theta_1, P_r[Y_i=1|H_1]=1-\theta_1$$

Using the distribution of the Bernoulli random variable, the sequential hypothesis score (or likelihood ratio) may be defined as follows:

$$\Lambda(Y) = \frac{P_r[Y|H_1]}{P_r[Y|H_0]} = \prod_{i=1}^{n} \frac{P_r[Y_i|H_1]}{P_r[Y_i|H_0]}$$

where Y is the vector of events observed and $P_r[Y|H_i]$ represents the probability mass function of event stream Y given $H_i$ is true. The score may be compared to an upper threshold $(\eta_1)$ and a lower threshold, $(\eta_0)$. If $\Lambda(Y) \geq \eta_0$ then $H_0$ (i.e., the host is benign), and if $\Lambda(Y) \geq \eta_1$ then $H_1$ (i.e., the host is malicious). If $\eta_0 < \Lambda(Y) < \eta_1$ then a pending state may be indicated and additional observation and/or testing may be performed.

In some embodiments, threshold values may be calculated based on user selected values $\alpha$ and $\beta$ which represent desired false positive and true positive rates, respectively. For example, where $\alpha=0.01$ and $\beta=0.99$, the upper bound threshold may be calculated as:

$$\eta_1 = \frac{\beta}{\alpha} = \frac{.99}{.01} = 99$$

while the lower bound is computed as:

$$\eta_0 = \frac{1-\beta}{1-\alpha} = \frac{1-.99}{1-.01} = .\overline{01}$$

Figure 3:
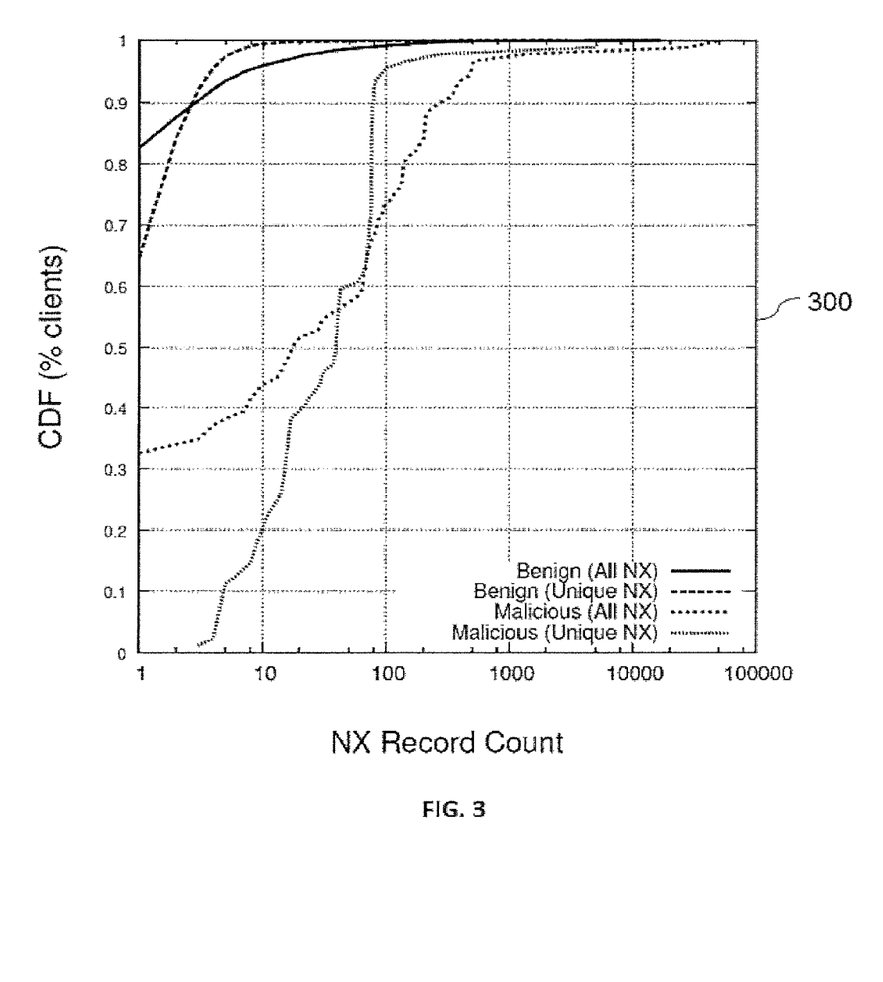
FIG. 3 is a graph illustrating DNS NX zone counts for benign and compromised computing hosts.

FIG. 3 is a graph illustrating NX zone counts for benign and compromised computing hosts. In some embodiments, various parameters associated with hypothesis test 210, such as $\theta_1$ and $\theta_0$, may be determined using historical data and/or traffic model data. For example, $\theta_0$ (e.g., the probability that a benign host sees a success event) and $\theta_1$ (e.g., the probability that a compromised host sees a success event) may be set prior to real-world deployment. Assuming a successful outcome as one where a host receives DNS NX messages for a zone it has already contacted at least once in the past and a failure outcome every time a NX response is generated for a zone not seen previously, such parameters may be estimated by tracking DNS NX messages on a per-host basis for a set window of time, counting successes and failures. Further, by assuming that the majority of DNS traffic is in fact benign and that AGD traffic comprises less than 2% of the overall traffic, an approximation of $\theta_0$ may be determined by simply computing the percent of successful connections for all NX traffic observed in that window of time.

Estimating $\theta_1$, on the other hand, may be more difficult task. If a network operator is fortunate enough to have an oracle by which she could separate benign from malicious hosts and build ground truth for her network, then $\theta_1$ may be estimated by simply computing the percent of successes generated by compromised hosts. However, in the real world, access to such an oracle is difficult, if not impossible; hence, $\theta_1$ must be estimated by other means. By discarding all hosts that generate less than $\delta$ failure events, a reasonable approximation of $\theta_1$ from the remaining traffic may be obtained since compromised hosts tend to generate far more failure events than benign hosts.

In some embodiments, an approximation of $\theta_1$ may be determined using DNS traffic and/or related information. For example, as illustrated in FIG. 3, ninety-five percent (95%) of benign hosts receive DNS NX messages for four or less unique zones, while ninety-eight percent (98%) of compromised hosts receive DNS NX messages for four or more hosts over a day. Hence, by monitoring only DNS NX traffic, a clear delineation between benign and compromised hosts may be determined. In this example, $\delta=4$ may be an appropriate approximation of $\theta_1$ since ninety-eight percent (98%) of compromised hosts receive DNS NX messages for four or more hosts over a day.

Figure 4:
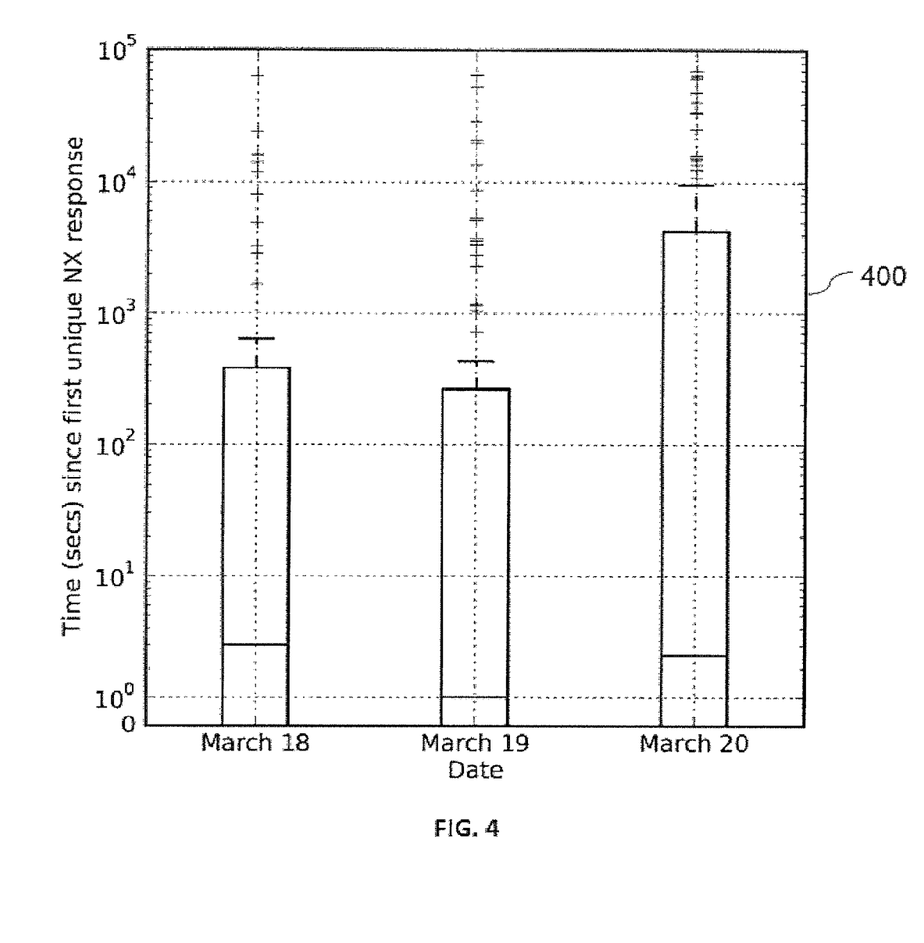
FIG. 4 is a graph illustrating time between classification and first unique DNS NX messages.

FIG. 4 is a box-and-whisker plot diagram illustrating time between classification and first unique DNS NX messages. As illustrated in FIG. 4, the majority of compromised hosts are correctly classified within only a few seconds of seeing the first unique DNS NX message. The speed of classification for a given host may be directly attributable to how quickly and/or how many DNS queries are performed by the host. For example, a compromised host may perform tens of DNS queries at once when attempting to communicate with a command-and-control server. In another example, a compromised host may use a delayed approach when attempting to communicate with a command-and-control server, e.g., by making singular DNS queries at uniform time intervals. In this example where a delayed approached is employed, classification techniques may take several hours to detect that the host is compromised.

In some embodiments, where compromised hosts are bots that receive instructions from a command-and-control server, a more appropriate measure may be to compute the time elapsed before a rendezvous event, e.g., an event where a bot successfully connects or rendezvous with its command-and-control server. By detecting a compromised host, prior to receiving instructions from a command-and-control server or even prior to a rendezvous event, most or all malicious activities performed by the compromised host may be mitigated or prevented.

Figure 5:
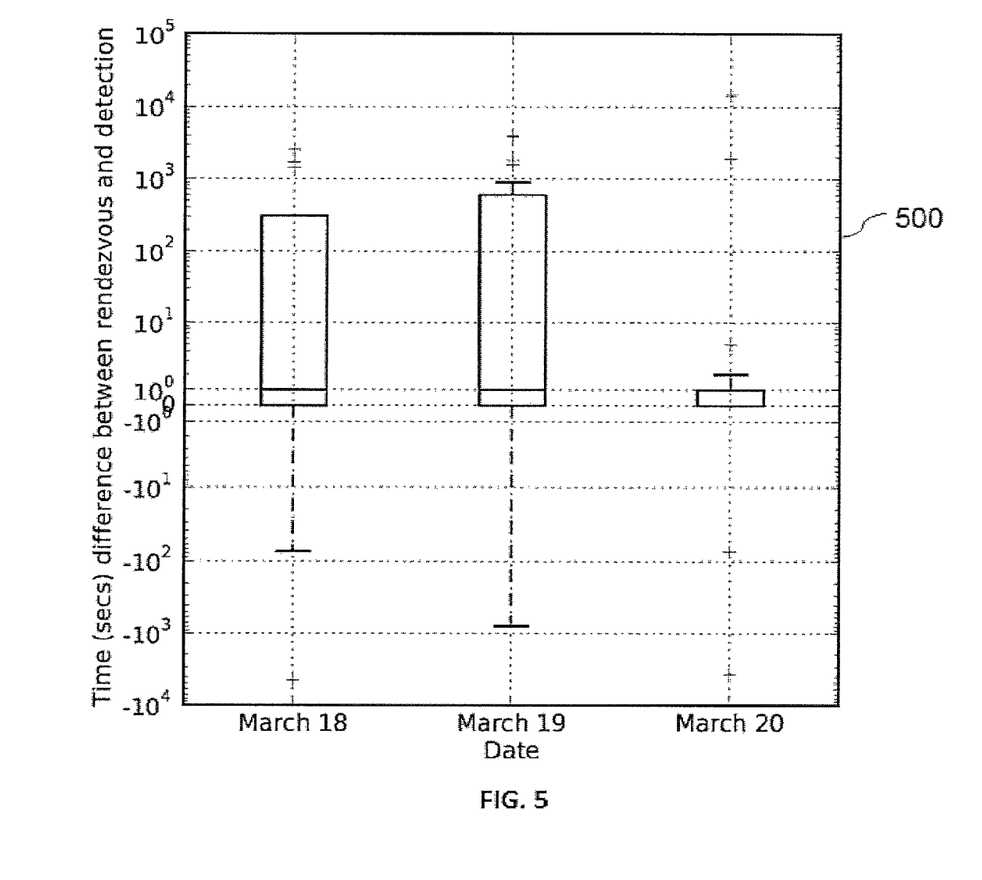
FIG. 5 is a graph illustrating time between classification and rendezvous events.

FIG. 5 is a box-and-whisker plot diagram illustrating time between classification and rendezvous events. As depicted, FIG. 5 shows the difference between the time of the rendezvous event and the time a host is classified. In 10 of 60 cases, the rendezvous event takes place before the compromised host is detected. In 16 cases, the host is classified as compromised at the same time as the rendezvous event, while in the remaining cases, the host is classified as compromised seconds before the actual contact with the command-and-control server was made. Overall, in 83% of the cases shown in FIG. 5, a host is detected or classified as compromised either shortly before or contemporaneously with the rendezvous event.

In some embodiments, hosts that remain in a pending state, also referred to as pending hosts, may be addressed via various techniques. For example, assuming that large portion (e.g., 99%) of pending hosts remain pending for a significant amount of time (e.g., at least 2.5 hours), strategies may be needed to remove these hosts from the pending list in order to reduce memory usage. One strategy for pruning pending hosts may include an approach similar to a Zipf Filter. For example, hosts may be removed that are associated with the top n unique zones in the pending host list. Another strategy for pruning pending hosts may include removing a certain percentage of the pending hosts based on their age (e.g., time in a pending state) or their unique NX response count.

FIG. 6 is a diagram illustrating an exemplary approach for visualizing domain name (e.g., AGD) traffic according to an embodiment of the subject matter described herein. For example, in an enterprise setting, a security analyst may need to investigate the list of hosts declared as compromised. To aid in this analysis, and to help reduce the cognitive load on the analyst, one or more techniques for grouping hosts based on their AGD traffic may be utilized. One such technique capitalizes on observations made about compromised hosts and/or related malicious software. For example, multiple hosts in a given network tend to be infected with the same type of bot, and the infected hosts tend to generate the same domain lookups because of the use of a global seed. These observations lend themselves to a natural grouping procedure for a set S, where S denotes the hosts declared as compromised during some time window:

$\forall i \in S$, let $S_i$ be the tuple $(l, n_0, n_1 \ldots n_m)$ where l is the host's IP, and $n_0, \ldots n_m$ the list of NX zones queried.

Let $G = \cup \; n_0, \ldots n_N \in S$

For each host l, let $b_l$ a bitmap of length N representing the zones in G and set the bits to 1 for the domains that the host queried.

Let the distance between two hosts $l_1$ and $l_2$ be distance $$(l_1, l_2) = \frac{1}{B_{l1,l2}}$$

where $B_{l1,l2}$ is the sum of the number of bits set of the resulting ANDed bitmaps.

Set S is clustered using hierarchical clustering [11].

Using this approach, various AGDs can be found in the sample data referenced in Table 1. For example, 747 hosts may be grouped creating 23 clusters of two or more hosts. Of those clusters, four clusters contain 59 of the 88 bots found in the ground truth. FIG. 6 depicts a sampling of the AGDs generated by the hosts in each cluster. AGDs in the largest fonts are ones that appear in all hosts in the cluster. AGDs in smaller fonts are ones that appear in less hosts in the cluster, where font size indicates appearance frequency. While visually clustering similar domains may help in analyzing AGD traffic, other resources may also be utilized. For example, publicly available blacklists and anti-virus websites may be accessed for information on suspect domains. Additionally, lookups on suspect domains (e.g., using dig) may be performed to see if they were sink-holed or blocked by certain DNS servers or services.

In some embodiments, unlike other approaches [4, 32, 33], the subject matter described herein may include configurations and techniques for quickly and efficiently analyzing live traffic and classifying hosts as benign or compromised based on traffic patterns related to DNS NX messages. For example, an Endace 9.2X2 Data Acquisition and Generation (DAG) card may be connected to a host machine in a university or campus network. This setup may be used to monitor DNS traffic at the border of the campus network. The DAG may capture DNS packets at line rates and store them in a shared memory buffer, e.g., without relying on the host. In this example, processor cores 108 (e.g., a 2.53 Ghz Intel Xeon core processor with 16 GB memory) may be utilized for packet inspection. As DNS packets are stored into the shared memory buffer by the DAG card, the DNS packets may be assigned to an available core (e.g., one of processor cores 108) to perform an initial dissection or processing. If the packet requires further processing, the packet may be passed from core to core in a pipeline, where each core is assigned a specific task. By utilizing a specialized or task-based core design, scalability may be ensured by dynamically assigning packets and tasks across multiple cores.

In some embodiments, node 102, data collector 104, and/or CHD module 110 may be configured to perform online network analysis and host classification at line speeds. For example, node 102, data collector 104, and/or CHD module 110 may support parallel or multithreaded processing. Such processing may involve utilizing two basic thread models: a staged pipeline to stitch together processing stages (dissection, signature matching, statistics, etc.), and a pool model to parallelize processing within each stage.

In some embodiments, each stage may run or execute on a different core and lock-free ring buffers [28] may be implemented to ensure high throughput across the pipeline buffer and ensure data synchronization. For example, a lock-free data structure may be implemented using Compare-and-Swap (CAS) primitives provided by underlying x86 architecture of processor cores 108. Packet dissection may be performed by protocol specific finite state machines (FSMs). Layers within a network packet may be modeled as states and transitions between states may be modeled as events. By using FSMs, protocol dissectors may be removed, added, or modified and also allows for dynamically assigning "processing depth" for an individual packet. For example, a DNS FSM can be easily modified such that more or less of the packet is dissected or analyzed.

By using a host classification approach based on DNS NX messages, memory and processing resources are conserved. For example, assuming a live traffic environment involving a campus network spanning a period of 24 hours, monitored traffic may reflect well-known diurnal patterns, with a large mid-day peak of approximately 80,000 DNS connections per minute. However, DNS NX traffic may account for less than 10% of the overall traffic, which highlights one of the benefits of using such data for detecting compromised hosts. Further, by focusing on 10% of the total traffic, packet loss is significantly decreased or even eliminated and, similarly, computing resources are minimized, e.g., less than 15% of computing resources required by other approaches.

Hence, the subject matter described herein includes a host classification approach that takes advantage of the fact that compromised hosts (e.g., bots) typically generate a relatively high number of unique NX responses when searching for a command-and-control server. For example, by using a lightweight approach based on sequential hypothesis testing involving DNS NX messages, extensive empirical evaluations show that host classification can be performed quickly and efficiently, e.g., in as little as three to four DNS NX messages. Moreover, since a sequential hypothesis testing approach uses a relatively small portion of total traffic (e.g., 10% of total traffic is DNS NX messages), resource utilization and scalability is greatly improved over conventional approaches.

Figure 7:
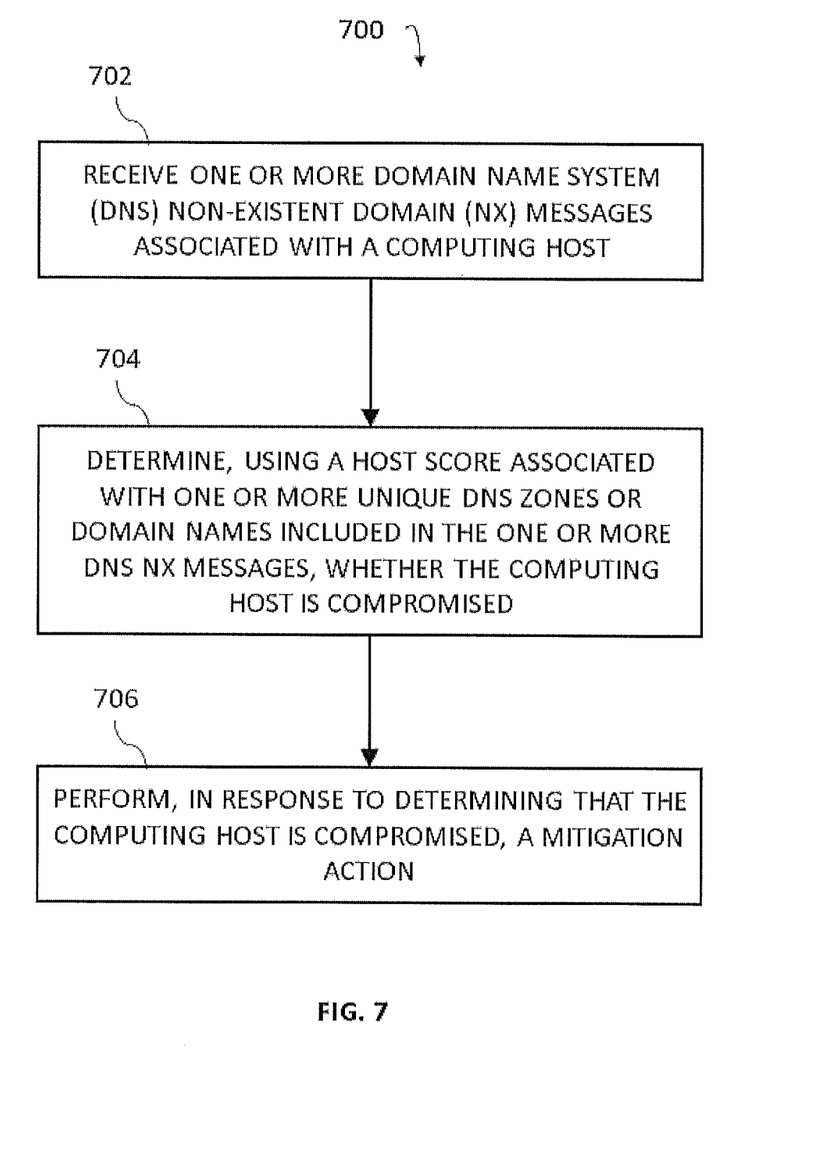
FIG. 7 is a flow chart illustrating an exemplary process for detecting a compromised computing host according to an embodiment of the subject matter described herein.

FIG. 7 is a flow chart illustrating an exemplary process 600 for detecting a compromised computing host according to an embodiment of the subject matter described herein. In some embodiments, exemplary process 600 or portions thereof may be performed by or at processor core 108, node 102, data collector 104, CHD module 110, and/or another node or module.

Referring to FIG. 7, in step 702, one or more DNS NX messages may be received. The one or more DNS NX messages may be associated with a computing host, such as a computer or smartphone.

In some embodiments, receiving one or more DNS NX messages may include observing and copying the one or more DNS NX messages from a plurality of DNS messages traversing a link or node.

In step 704, it may be determined, using a host score associated with one or more unique DNS zones or domain names included in the one or more DNS NX messages, whether the computing host is compromised.

In some embodiments, determining whether a computing host is compromised may include determining whether a host score reaches a threshold value within a time period.

In some embodiments, performing, in response to determining that a computing host is compromised, a mitigation action may occur prior to a rendezvous event, e.g., prior to the computing host communicating with a malicious entity or a command server.

In some embodiments, a host score may be incremented when a received DNS NX message of the one or more DNS NX messages is associated with a unique DNS zone or domain name.

In some embodiments, one or more unique DNS zones or domain names may be indicative of a malicious activity.

In some embodiments, one or more unique DNS zones or domain names may be previously unknown to the computing host or a validating entity.

In some embodiments, a host score may be decremented when a received DNS NX message of the one or more DNS NX messages is associated with a non-unique DNS zone or domain name.

In some embodiments, a non-unique DNS zone or domain name may be indicative of a benign activity.

In some embodiments, a non-unique DNS zone or domain name may be previously known to the computing host or a validating entity.

In some embodiments, determining whether a computing host is compromised may include using sequential hypothesis testing.

In some embodiments, sequential hypothesis testing may use one or more parameters based on or determined by a network characteristic, a network delay, a user base, a resource utilization indicator, a resource characteristic, or a predetermined value.

In some embodiments, determining whether a computing host is compromised may include analyzing a header portion or a payload portion of the one or more DNS NX messages using a lock-free data structure.

In some embodiments, a lock-free data structure may be used to process in parallel a plurality of streams.

In step 706, a mitigation action may be performed in response to determining that the computing host is compromised.

In some embodiments, a mitigation action may include reporting the computing host to an entity, logging information about the computing host, logging information about a DNS zone or domain name associated with the computing host, discarding a message from or to the computing host, logging a message from or to the computing host, or rerouting a message from or to the computing host.

In some embodiments, steps 702, 704, and/or 704 may be performed by a DAG, a graphics processing unit (GPU), or a general-purpose processor.

The disclosure of each of the following references is incorporated herein by reference in its entirety.

[1] Amazon. Cloudfront concepts. http://goo.gl/2W7Bo, 2012.

[2] M. Antonakakis, R. Perdisci, D. Dagon, W. Lee, and N. Feamster. Building a Dynamic Reputation System for DNS. In USENIX Security Symposium, 2010.

[3] M. Antonakakis, R. Perdisci, W. Lee, N. Vasiloglou, and D. Dagon. Detecting Malware Domains at the Upper DNS Hierarchy. In USENIX Security Symposium, 2011.

[4] M. Antonakakis, R. Perdisci, Y. Nadji, N. Vasiloglou, S. Abu-Nimeh, W. Lee, and D. Dagon. From Throw-Away Traffic to Bots: Detecting the Rise of DGA-based Malware. In USENIX Security Symposium, 2012.

[5] L. Bilge, E. Kirda, C. Kruegel, and M. Balduzzi. EXPOSURE: Finding Malicious Domains using Passive DNS Analysis. Proceedings of the Annual Network and Distributed System Security (NDSS), February 2011.

[6] K. Born and D. Gustafson. Detecting DNS Tunnels Using Character Frequency Analysis. In Proceedings of the Annual Security Conference (ACSAC), 2010.

[7] Chrome Team. The Chromium Projects. See http://goo.gl/TupFA.

[8] H. Crawford and J. Aycock. Kwyjibo: Automatic domain name generation. Software: Practice and Experience, 38(14), November 2008.

[9] J. Dilley, B. Maggs, J. Parikh, H. Prokop, R. Sitaraman, and B. Weihl. Globally distributed content delivery. Internet Computing, IEEE, 6(5), September/October 2002. 11

[10] A. Eckelberry. Massive italian typosquatting ring foists malware on users. http://www.gfi.com/blog/massive-italian\-typosquatting-ring-foists-malware-on-users/, 2007.

[11] B. Everitt, S. Landau, M. Leese, and D. Stahl. Cluster Analysis. Wiley Series in Probability and Statistics. Wiley, 2011.

[12] M. Felegyhazi, C. Kreibich, and V. Paxson. On the potential of proactive domain blacklisting. In Proceedings of USENIX conference on Large-Scale Exploits and Emergent Threats (LEET), 2010.

[13] S. Golovanov and I. Soumenkov. TDL4_Top_Bot. See http://www.securelist.com/en/analysis/204792180/TDL4_Top_Bot, 2011.

[14] S. Hao, N. Feamster, and R. Pandrangi. Monitoring the Initial DNS Behavior of Malicious Domains. In ACM SIGCOMM Internet Measurement Conference, 2011.

[15] J.-W. Ho, M. Wright, and S. Das. Fast detection of mobile replica node attacks in wireless sensor networks using sequential hypothesis testing. Mobile Computing, IEEE Transactions on, 10(6):767-782, June 2011

[16] S. Inc. Exploring the blackhole exploit kit. http://nakedsecurity.sophos.com/exploring-the-blackhole-exploit-kit/, 2012.

[17] ISC. Google Chrome and (weird) DNS Requests. http://goo.gl/j48CA, 2011.

[18] J. Jung, V. Paxson, A. W. Berger, and H. Balakrishnan. Fast Portscan Detection Using Sequential Hypothesis Testing. In IEEE Symposium on Security and Privacy, May 2004.

[19] J. Jung, R. Milito, and V. Paxson. On the adaptive real-time detection of fast-propagating network worms. Journal in Computer Virology, 4:197-210, 2008.

[20] D. Kaminsky. Black ops 2008-its the end of the cache as we know it. Black Hat USA, 2008.

[21] S. Kullback and R. Leibler. On information and sufficiency. The Annals of Mathematical Statistics, 22(1): 79-86, 1951.

[22] U. Parasites. Runforestrun and pseudo random domains. http://blog.unmaskparasites.com/2012/06/22/runforestrun-and-pseudo-random-domains/, 2012.

[23] P. H. R. O. Duda and D. Stork. Pattern Classification. Springer-Verlag New York, Inc., Secaucus, N.J., USA, September 2007.

[24] S. E. Schechter, J. Jung, and A. W. Berger. Fast detection of scanning worm infections. In In Proceedings of the International Symposium on Recent Advances in Intrusion Detection (RAID), pages 59-81, 2004.

[25] R. Sommer, V. Paxson, and N. Weaver. An architecture for exploiting multi-core processors to parallelize network intrusion prevention. Concurr. Comput.: Pract. Exper., 21(10):1255-1279, July 2009.

[26] S. Son and V. Shmatikov. The Hitchhiker's Guide to DNS Cache Poisoning. Intl. Conf. on Security and Privacy in Communication Networks, September 2010.

[27] B. Stone-Gross, M. Cova, L. Cavallaro, B. Gilbert, M. Szydlowski, R. Kemmerer, C. Kruegel, and G. Vigna. Your botnet is my botnet: Analysis of a botnet takeover. In Proceedings of the ACM conference on Computer and communications security (CCS), pages 635-647, 2009.

[28] J. Valois. Implementing lock-free queues. In Proceedings of the Seventh International Conference on Parallel and Distributed Computing Systems, pages 64-69, 1994.

[29] R. Villamarn-Salomn and J. Brustoloni. Identifying botnets using anomaly detection techniques applied to dns traffic. In IEEE Consumer Communications & Networking Conference (CCNC), 2008.

[30] A. Wald. Sequential Analysis. John Wiley and Sons, Inc., 1947.

[31] N. Weaver, S. Staniford, and V. paxson. Very fast containment of scanning worms, revisited. In Malware Detection, pages 113-145. 2007.

[32] S. Yadav and A. N. Reddy. Winning with dns failures: Strategies for faster botnet detection. In International Conference on Security and Privacy in Communication Networks, 2011.

[33] S. Yadav, A. K. K. Reddy, A. N. Reddy, and S. Ranjan. Detecting algorithmically generated malicious domain names. In Proceedings of the Internet Measurement Conference (IMC), pages 48-61, 2010.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for detecting a compromised computing host, the method comprising:
receiving, within a time period, one or more domain name system (DNS) non-existent domain (NX) messages associated with a computing host;
determining, using a host score associated with one or more unique DNS zones or domain names included in the one or more DNS NX messages, whether the computing host is compromised, wherein the host score is adjusted up or down based on whether a given DNS zone or domain name has been observed previously in the one or more DNS NX messages, wherein the host score is incremented when a received DNS NX message of the one or more DNS NX messages includes a unique DNS zone or domain name and wherein the host score is decremented when a received DNS NX message of the one or more DNS NX messages includes a non-unique DNS zone or domain name, wherein determining whether the computing host is compromised includes determining whether the host score reaches or exceeds a threshold value within the time period; and
performing, in response to determining that the computing host is compromised, a mitigation action.

2. The method of claim 1 wherein receiving the one or more DNS NX messages includes observing and copying the one or more DNS NX messages from a plurality of DNS messages traversing a link or node.

3. The method of claim 1 performing, in response to determining that the computing host is compromised, a mitigation action occurs prior to the computing host communicating with a malicious entity or a command server.

4. The method of claim 1 wherein the one or more unique DNS zones or domain names are indicative of a malicious activity or the one or more unique DNS zones or domain names are previously unknown to the computing host or a validating entity.

5. The method of claim 1 wherein the non-unique DNS zone or domain name is indicative of a benign activity or the non-unique DNS zone or domain name is previously known to the computing host or a validating entity.

6. The method of claim 1 wherein determining whether the computing host is compromised includes using sequential hypothesis testing.

7. The method of claim 6 wherein the sequential hypothesis testing uses one or more parameters based on or determined by a network characteristic, a network delay, a user base, a resource utilization indicator, a resource characteristic, or a predetermined value.

8. The method of claim 1 wherein determining whether the computing host is compromised includes analyzing a header portion or a payload portion of the one or more DNS NX messages using a lock-free data structure.

9. The method of claim 1 wherein a lock-free data structure is used to process in parallel a plurality of streams.

10. The method of claim 1 wherein the mitigation action includes reporting the computing host to an entity, logging information about the computing host, logging information about a DNS zone or domain name associated with the computing host, discarding a message from or to the computing host, logging a message from or to the computing host, or rerouting a message from or to the computing host.

11. The method of claim 1 wherein the receiving, the determining, or the performing steps are performed by a data acquisition and generation card (DAG), a graphics processing unit (GPU), or a general-purpose processor.

12. A system for detecting a compromised computing host, the system comprising:
a processor; and
a compromised host detection (CHD) module including software executable by the processor, the CHD module configured to receive, within a time period, one or more domain name system (DNS) non-existent domain (NX)

messages associated with a computing host, to determine, using a host score associated with one or more unique DNS zones or domain names included in the one or more DNS NX messages, whether the computing host is compromised, wherein the host score is adjusted up or down based on whether a given DNS zone or domain name has been observed previously in the one or more DNS NX messages, wherein the host score is incremented when a received DNS NX message of the one or more DNS NX messages includes a unique DNS zone or domain name and wherein the host score is decremented when a received DNS NX message of the one or more DNS NX messages includes a non-unique DNS zone or domain name, wherein determining whether the computing host is compromised includes determining whether the host score reaches or exceeds a threshold value within the time period; and to perform, in response to determining that the computing host is compromised, a mitigation action.

13. The system of claim 12 comprising:
a data collector configured to observe and copy the one or more DNS NX messages from a plurality of DNS messages traversing a link or node.

14. The system of claim 12 wherein the one or more unique DNS zones or domain names are indicative of a malicious activity or the one or more unique DNS zones or domain names are previously unknown to the computing host or a validating entity.

15. The system of claim 12 wherein the non-unique DNS zone or domain name is indicative of a benign activity or the non-unique DNS zone or domain name is previously known to the computing host or a validating entity.

16. The system of claim 12 wherein the CHD module is configured to determine whether the computing host is compromised by using sequential hypothesis testing.

17. The system of claim 16 wherein the sequential hypothesis testing uses one or more parameters based on or determined by a network characteristic, a network delay, a user base, a resource utilization indicator, a resource characteristic, or a predetermined value.

18. The system of claim 12 wherein the CHD module is configured to analyze a header portion or a payload portion of the one or more DNS NX messages using a lock-free data structure.

19. The system of claim 12 comprising a lock-free data structure configured to process in parallel a plurality of streams.

20. The system of claim 12 wherein the mitigation action includes reporting the computing host to an entity, logging information about the computing host, logging information about a DNS zone or domain name associated with the computing host, discarding a message from or to the computing host, logging a message from or to the computing host, or rerouting a message from or to the computing host.

21. The system of claim 12 wherein the processor includes a data acquisition and generation card (DAG), a graphics processing unit (GPU), or a general-purpose processor.

22. A non-transitory computer readable medium having stored thereon executable instructions that when executed by a processor of a computer control the computer to perform steps comprising:
receiving, within a time period, one or more domain name system (DNS) non-existent domain (NX) messages associated with a computing host;
determining, using a host score associated with one or more unique DNS zones or domain names included in the one or more DNS NX messages, whether the computing host is compromised, wherein the host score is adjusted up or down based on whether a given DNS zone or domain name has been observed previously in the one or more DNS NX messages, wherein the host score is incremented when a received DNS NX message of the one or more DNS NX messages includes a unique DNS zone or domain name and wherein the host score is decremented when a received DNS NX message of the one or more DNS NX messages includes a non-unique DNS zone or domain name, wherein determining whether the computing host is compromised includes determining whether the host score reaches or exceeds a threshold value within the time period; and
performing, in response to determining that the computing host is compromised, a mitigation action.

* * * * *